(12) United States Patent
Cain

(10) Patent No.: US 8,279,487 B2
(45) Date of Patent: Oct. 2, 2012

(54) COLOR DETECTION DURING DOCUMENT ANALYSIS PRIOR TO PRINTING

(75) Inventor: Shane Matthew Cain, Carlsbad, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 767 days.

(21) Appl. No.: 12/490,820

(22) Filed: Jun. 24, 2009

(65) Prior Publication Data
US 2010/0328684 A1  Dec. 30, 2010

(51) Int. Cl.
*G06F 15/00* (2006.01)
*H04N 1/40* (2006.01)

(52) U.S. Cl. .......................... 358/1.9; 358/1.13

(58) Field of Classification Search ............. 358/1.1, 358/1.9, 2.1, 3.01, 3.06, 3.12, 3.27, 1.13, 358/1.15, 1.18, 515, 518, 529; 382/162, 382/163, 167, 171, 173, 178
See application file for complete search history.

(56) References Cited

U.S. PATENT DOCUMENTS

| | | | |
|---|---|---|---|
| 6,302,522 B1 | 10/2001 | Rumph et al. | |
| 6,456,403 B1 | 9/2002 | Archer et al. | |
| 6,515,764 B1 | 2/2003 | Knox et al. | |
| 6,718,878 B2 | 4/2004 | Grosso et al. | |
| 6,773,176 B2 | 8/2004 | Kurosawa | |
| 6,958,828 B2 | 10/2005 | Knox et al. | |
| 7,355,742 B2 * | 4/2008 | Okamura | 358/1.18 |
| 7,417,770 B2 | 8/2008 | Fukao | |
| 2001/0024584 A1 | 9/2001 | Kurosawa | |
| 2002/0005134 A1 | 1/2002 | Grosso et al. | |
| 2003/0058467 A1 | 3/2003 | Knox et al. | |
| 2004/0105126 A1 | 6/2004 | Minowa | |
| 2005/0078867 A1 | 4/2005 | Kanno | |
| 2006/0072778 A1 | 4/2006 | Harrington | |
| 2006/0203272 A1 | 9/2006 | Manalo et al. | |
| 2006/0225595 A1 | 10/2006 | Gilfix | |
| 2006/0238781 A1 | 10/2006 | Fukao | |
| 2006/0268287 A1 | 11/2006 | Robinson | |
| 2007/0188828 A1 | 8/2007 | Suzuki et al. | |
| 2007/0229881 A1 * | 10/2007 | Matsubara et al. | 358/1.15 |
| 2007/0291331 A1 | 12/2007 | Sekizawa et al. | |
| 2007/0292003 A1 * | 12/2007 | Hirabayashi | 382/120 |
| 2008/0079963 A1 * | 4/2008 | Matsubara | 358/1.9 |
| 2008/0174796 A1 * | 7/2008 | Yoo | 358/1.9 |

* cited by examiner

*Primary Examiner* — Gabriel Garcia
(74) *Attorney, Agent, or Firm* — Chen Yoshimura LLP

(57) ABSTRACT

In a print shop system including a plurality of printers and a print shop management server which manages print jobs, an improved method is described for detecting color components in a document page for purposes of assigning the document to appropriate printers for printing. First, each page element is analyzed without rasterizing the page. If a raster image is colored, its location and size are added to an image information list. If a non-raster graphical element overlaps a raster image previously stored in the image information list, the overlapped raster image is removed from the list. After analyzing all page elements of the page, if any raster image remains in the image information list, the page is marked as colored. Otherwise, the page is rasterized to detect colored using a conventional method. The resolution used for page rasterization may be controlled by a user.

12 Claims, 4 Drawing Sheets

COLOR DETECTION DURING DOCUMENT ANALYSIS PRIOR TO PRINTING

BACKGROUND OF THE INVENTION

1. Field of the Invention

This invention relates to a method and apparatus for managing print jobs in a print shop system for printing documents that contain both color and black and white pages. In particular, it relates to an improved method for detecting color components in such documents for purposes of assigning documents to appropriate printers for printing.

2. Description of Related Art

A professional print shop typically has a plurality of printers connected to a server by a network, where the server controls the printing of customer jobs on one or more printers. The printers in a print shop typically have different characteristics and capabilities. In particular, a print shop typically has both black and white printers and color printers. A conventional practice is to print documents containing only black and white (B&W) pages using black and white printers, and to print documents containing B&W as well as color pages using color printers. Here, the term B&W page includes a page with gray-level images, which can be printed on a B&W printer using black ink or toner, for example, as halftone images. Printing with a color printer is typically more costly than printing with a black and white printer.

An improved print shop management method allows a document containing B&W as well as color pages to be split into two sub-documents, one color document and one B&W document, and prints the two documents using two separate printers, one color printer and one B&W printer, respectively. In a method described in commonly owned U.S. Pat. Appl. Pub. No. 2007/0229881A1, when a document to be printed contains both color and B&W pages, the server splits the print job into a color and a B&W sub-job. Each print job includes a job ticket containing a plurality of parameters and the document to be printed. The server splits the original print job by generating a color sub-document and a B&W sub-document based the color characteristics of the pages of the original document, and generating a color sub-job ticket and a B&W sub-job ticket based on the original job-ticket parameters, by suitably retaining some original parameters, overriding some, deleting some, retaining some with page shifting, and adding some parameters. The two sub-jobs are printed by two different printers and the printed pages are then merged into one set of pages. In another method described in commonly owned U.S. Pat. Appl. Pub. No. 2008/0079963A1, to print a document having both color and B&W pages using N-up and/or duplex printing, the server determines whether to print the entire document on a color printer or to split the document into two sub-jobs and print them on a color printer and a B&W printer, respectively.

In order to determine how to assign a print job to appropriate printers, the server needs to determine whether each page of the document is a B&W page (i.e. it contains only black and white content) or whether it is a color page (i.e. it contains color content, whether or not it also contains B&W content).

SUMMARY

The present invention is directed to an improved method and apparatus for detecting color content of a page for purpose of assigning the print job to appropriate printers.

An object of the present invention is to provide a more efficient and more flexible method for detecting color content of a page.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented on a server computer for detecting color content in a page of a document, the page containing a plurality of page elements including raster images and non-raster graphical elements, the method including: (a) analyzing each page element, including: (a1) for each raster image, determining whether it is colored, and if it is, storing location and size information about the raster image in an image information list; and (a2) for each non-raster graphical element, determining whether it overlaps a raster image previously stored in the image information list, and if it does, removing the overlapped raster image from the image information list; (b) after analyzing all page elements of the page, determining whether any raster image remains in the image information list, and marking the page as colored if any raster image remains, and (c) if no raster image remains in the image information list, generating a raster image of the page using the page elements, detecting any colored samples in the raster image of the page, and marking the page as colored or black and white based on a result of the detection.

Step (a1) may further includes: analyzing the raster image in a first predefined area near a corner of the raster image to determine if it contains any colored samples, and if it does, adding the size and location information of the raster image into the image information list; if the first predefined area does not contain any colored samples, analyzing the raster image in a second predefined area near a center of the raster image to determine if it contains any colored samples, and if it does, adding the size and location information of the raster image into the image information list; and if the first and second areas do not contain any colored samples, dividing the raster image into a predefined plurality of partitions, and analyzing each of a selected subset of partitions to determine if it contains any colored samples, and if any of the selected partition contains a colored sample, adding the size and location information of the raster image into the image information list.

In another aspect, the present invention provides a computer program product that causes a data processing apparatus to perform the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 3:
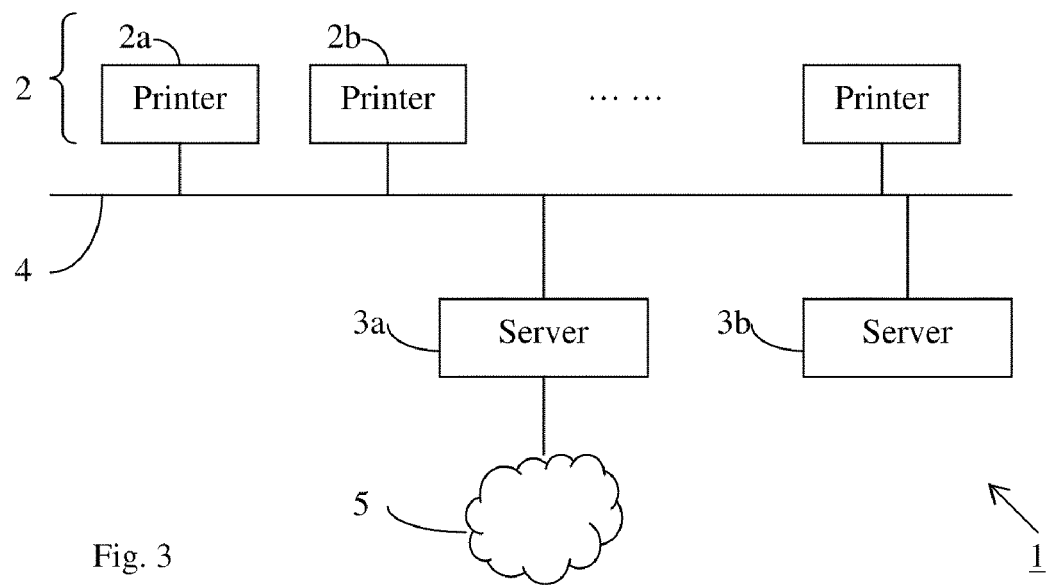
FIG. 3 illustrates a print shop system in which embodiments of the present invention may be implemented.

FIG. 3 schematically shows a print shop system 1 in which embodiments of the present invention may be implemented. The print shop system 1 includes a plurality of printers 2a, 2b, . . . connected to one or more servers (or any suitable data processing apparatus) 3a, 3b via a network 4. One or more user interface terminals (not shown) are also connected to the server to enable print shop operators to interact with the server and the rest of the system. The servers may also be connected to an external network 5 such as the Internet for receiving print jobs (i.e. print requests from customers and documents to be printed). The server (3a in this example), under control of print shop management software, receives print jobs from customers and submits print commands and data to be printed to one or more printers 2. The print shop management software may make various management decisions, such as which printer(s) to use for a print job, either automatically or under various degree of control of an operator.

When a document to be printed (hereinafter referred to as the source document) contains both color pages and B&W pages (referred to as a mixed color document), the server 3a makes a determination as to whether to submit the entire print job (i.e. all pages of the source document) to a color printer(s), or to split the print job into two sub-jobs by submitting the color pages to a color printer(s) and the black and white pages to a black and white printer(s). If the server 3a decides to split the print job into two sub-jobs, the server splits the print job by generating two sub-job tickets, and submits them to two different printers. The printed pages from the two printers are then combined into one printed document.

To properly process a print job, the server 3a must determine whether each page of the document is a B&W page or a color page. This information is then used in processes such as splitting the document for printing based on color, defining print job constraints, etc. In an existing color detection method, the server 3a uses a software program that parses and analyzes the source documents. The server 3a collects all vector and raster graphical data for each page and uses that information to render the page to an RGB or RGBA-based bitmap in memory. Here, RGBA stands for color components red, green, blue, and alpha (which represents opacity of the sample). Then, the R, G, and B values of each sample in the stored bitmap are examined for color. A sample is considered colored if its R, G and B values are not identical. This method has the advantage of examining all elements of the final page image. However, it tends to be computationally intensive and may affect the performance of the color detection process, especially when it involves rasterizing pages with large, embedded images (i.e. document raster source images such as .TIFF files that contain a large number of samples). The performance issue is more severe when the rasterization process is carried out by a computer (e.g. the server 3a) that is concurrently processing multiple documents of many types as well as running other services and applications.

Embodiments of the present invention provide a flexible solution for increasing document analysis efficiency by adding options to the server application that can be controlled and adjusted by a user (preferably a user with administration level privileges). In a first embodiment, the server 3a uses an improved color detector algorithm which reads "partitions" (i.e. sections) of each image on a page prior to rasterizing the page to promote early color detection. In a second embodiment, the user selects a DPI value for page rasterization for purposes of color detection. These methods are implemented as a part of the print shop management software executed by the server 3a.

An improved color detector algorithm according to the first embodiment of the present invention is described with reference to FIGS. 1a and 1b. In this algorithm, before rasterizing a page for color detection, the page is decomposed during which each embedded source raster image (e.g. an embedded .TIFF file on a PDF page) is analyzed for color.

Figure 1A:
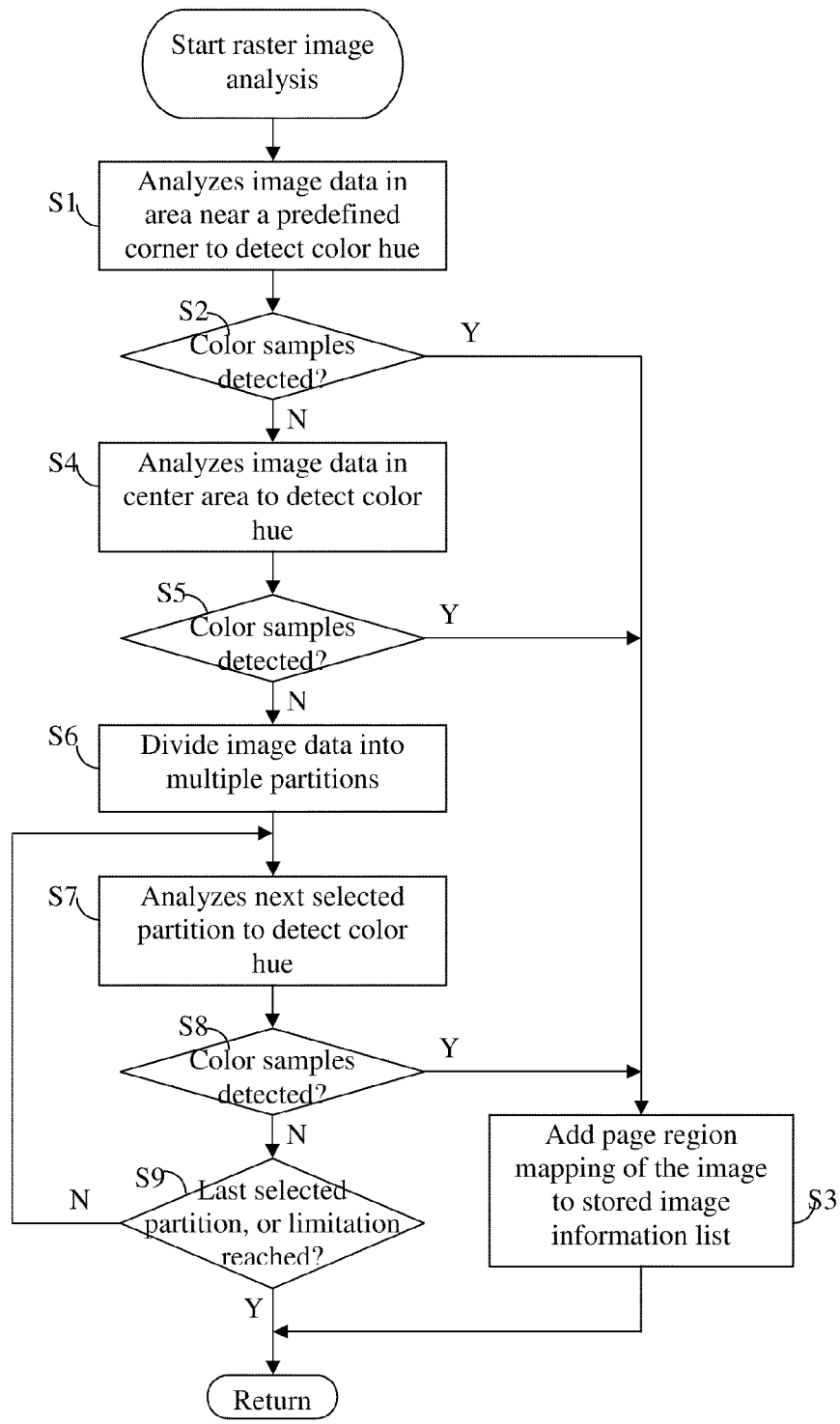
FIGS. 1a and 1b are flow charts showing a color detection method according to an embodiment of the present invention.

FIG. 1a illustrates a method for analyzing a source raster image on a page for determining whether it is colored. The process first analyzes raw image data (in image space) representing an area near a predetermined corner of the source raster image for a color hue (step S1). The predetermined corner may be, for example, the upper left corner. Here, the upper left corner is the location considered the "upper left corner" if viewing the image normally on a user interface display. The area has a predetermined size, such as 3000 by 4000 samples. A color hue is detected by looking for differing R, G, and B values (0 to 255) for each sample in the data. If the R, G, B values are equal for a sample, the sample is considered B&W (which may include gray-level). Otherwise, it is considered colored.

If a colored sample is detected in step S1 ("Y" in step S2), size and location information about the source raster image is added to a stored image information list (using pointers) (step S3) and the image analysis process returns. The size and location information may include, for example, a mapping of the image to its desired region of the page (referred to as page region mapping herein, the method of which is well known in the field). If no colored samples are detected in step S1 for a source raster image ("N" in step S2), the process analyzes the raw image data (in image space) representing an area near the center of the source raster image for a color hue (step S4). Here, the center is the location considered the "center" if viewing the image normally on a UI display. Again, the area has a predetermined size such as 3000 by 4000 samples. A color hue is detected by looking for differing R, G, and B values (0 to 255) for each sample in the data.

If a colored sample is detected in step S4 ("Y" in step S5), information about the page region mapping of the source raster image is added to the stored image information list (step S3) and the image analysis process returns. If no colored sample is detected in step S4 ("N" in step S5), the raw image data for the entire source raster image (in image space) is divided into a number of partitions (step S6). Then, a selected subset of partitions (but not all partitions) are analyzed for a color hue by looking for differing R, G, and B values for each sample in the selected partition (steps S7-S9). In one implementation, the selected partitions include every other partition forming a checkerboard pattern.

In step S7, the process analyzes the next selected partition for a color hue. If a colored sample is detected ("Y" in step S8), information about the page region mapping of the source raster image is added to the stored image information list (step S3) and the image analysis process returns. If no colored samples are found ("N" in step S8), the process goes back to step S8 to analyze the next selected partition for a color hue, until a colored sample is found in a selected partition ("Y" in step S8), or the end of the image is reached (i.e. the last selected partition has been analyzed, "Y" in step S9), or a specified limitation is reached ("Y" in step S9). A set of limitations may be previously specified for this purpose, for example, a limitation of "bytes to analyze", a buffer size/memory storage limitation, an image size threshold, etc. Checking for limitation in step S9 is preferred but not mandatory. The image analysis process returns if the last partition has been analyzed or a limitation is reached ("Y" in step S9).

Figure 1B:
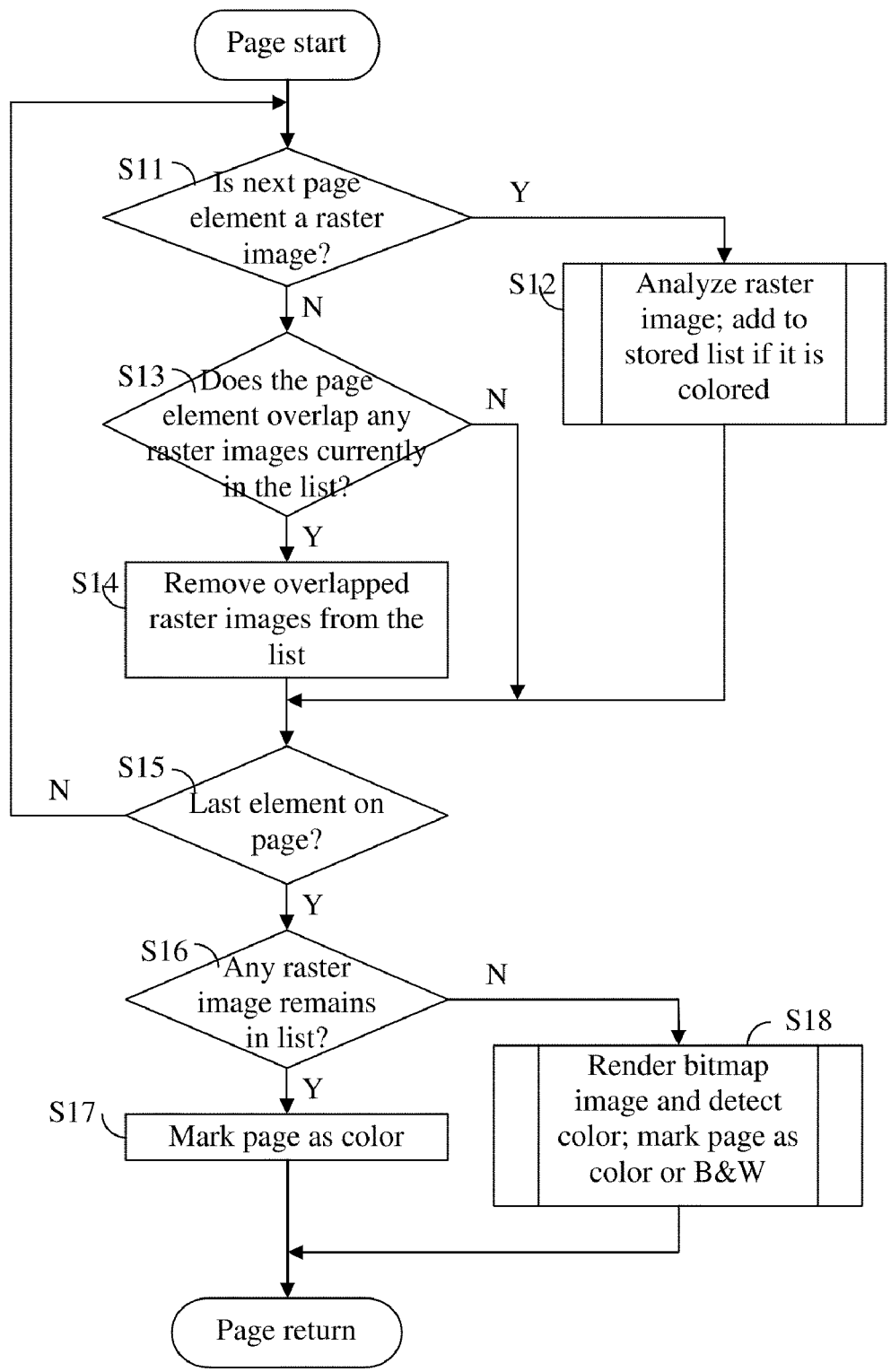

FIG. 1b illustrates the overall process of analyzing a page for color. This page analysis process examines each page element in the order in which they are drawn on the page. A page element may be a raster image or other types of non-raster graphical element such as text, path (a set of vector graphic coordinates for drawing lines, curves, etc.), etc. If the next page element is a raster image ("Y" in step S11), the image analysis process shown in FIG. 1a is executed to determine if the image is colored (step S12). During the image analysis process, the raster image (including its page region mapping) is added to the stored image information list if the image is determined to be colored. The process then goes back to step S11 to process the next page element unless all elements are processed ("Y" in step S15).

In step S11, if the page element is not a raster image ("N" in step S11), the page element is examined to determine if it overlaps with any raster images currently stored in the image information list (step S13). This step uses the information about the page region mapping of the image stored in the image information list to determine any overlap. If the page element overlaps with any image in the stored image information list ("Y" in step S13), the overlapped images are removed from the list (step S14). In one implementation, an exception is made in the removal step S14 such that, if the raster image in the list is one for which color was detected in the center area, and if the overlapping page element does not overlap the center area of the raster image, then the raster image remains in the list.

After step S14, or if the page element does not overlay any raster image in the stored list ("N" in step S13), the process goes back to step S11 to process the next page element unless all elements have been examined ("Y" in step S15).

After all page elements on the page have been examined ("Y" in step S15), if any (at least one) image remains in the stored image information list ("Y" in step S16), the page is marked as color (step S17). Otherwise, the page is rasterized and the page bitmap (i.e. raster image) is analyzed for color, and the page is marked as color or B&W as the result of this analysis (step S18). Step S18 may use the same color detector method as the existing color detection process described earlier. The page analysis process returns after steps S17 or S18.

Another improved color detector algorithm according to the second embodiment of the present invention allows a user to select a spatial resolution (e.g. a DPI or dots per inch value) to be used for rasterization for the purpose of color detection. In the existing color detection process described earlier, as well as in step S18 of the process shown in FIG. 1b, the resolution used to render the page bitmap image for color detection is not necessarily the same resolution used in the actual printing of the document. Typically, to increase color detection speed, the resolution used to render a page bitmap for color detection is lower than the resolution used in the actual printing process. Higher resolution is required for color detection only in rare cases, e.g., when the page raster image contains only a small number of (typically isolated) color samples at the actual resolution, which would be lost if the page bitmap is rendered at a lower resolution.

Figure 2:
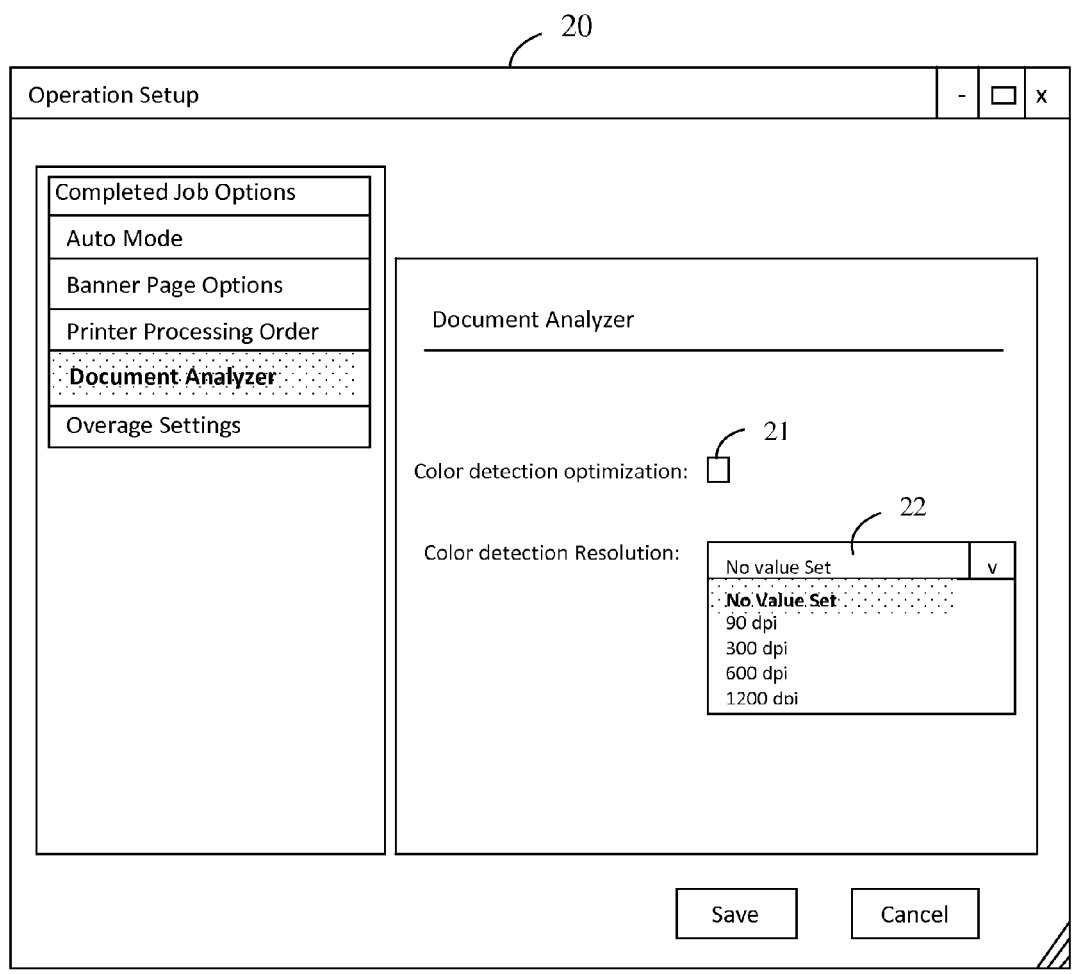
FIG. 2 illustrates a user interface window for specifying various settings for a color detection process according to another embodiment of the present invention.

FIG. 2 illustrates a user interface (UI) window of the print shop management software of the server 3a. As shown in FIG. 2, the UI window 20 provides an input tool 22 (a drop down list in this example) to allow the user to input a resolution (DPI) value for rasterizing the page for color detection. In this particular example, the user may select 90, 300, 600, or 1200 dpi. A default value, such as 90 dpi, will be used if the user does not select a resolution value.

Further, the UI window 20 provides an input tool 21 (a checkbox in this example) for the user to input a mode selection to enable or disable color detection optimization. If color detection optimization is enabled (first mode), the print shop management software executes the color detection algorithm of FIGS. 1a and 1b; if it is disabled (second mode), the print shop management software executes the existing color detection algorithm described earlier, i.e., it rasterizes the page and examines the color components of each sample for a color hue. The second mode allows a user to disable optimization, for example, in rare cases where per page rasterization is desirable, such as when the embedded document raster images have large numbers of black and white samples and sparse color samples. In either mode, the software will use the user selected DPI value or the default DPI value if none is selected.

As can be seen from the above descriptions, advantages of embodiments of the present invention include optimizing the color detector process and providing the user more control over the process. The color detector method according to the first embodiment increases document processing speed by reducing per page rasterization requirement for pages with color images. The method according to the second embodiment allows the user to select the resolution used for color detection.

It will be apparent to those skilled in the art that various modification and variations can be made in the improved color detection method and apparatus of the present invention without departing from the spirit or scope of the invention. Thus, it is intended that the present invention cover modifications and variations that come within the scope of the appended claims and their equivalents.

What is claimed is:

1. A method implemented on a server computer for detecting color content in a page of a document, the page containing a plurality of page elements including raster images and non-raster graphical elements, the method comprising:
   (a) analyzing each page element, including:
      (a1) for each raster image, determining whether it is colored, and if it is, storing location and size information about the raster image in an image information list; and
      (a2) for each non-raster graphical element, determining whether it overlaps a raster image previously stored in the image information list, and if it does, removing the overlapped raster image from the image information list;
   (b) after analyzing all page elements of the page, determining whether any raster image remains in the image information list, and marking the page as colored if any raster image remains, and
   (c) if no raster image remains in the image information list, generating a raster image of the page using the page elements, detecting any colored samples in the raster image of the page, and marking the page as colored or black and white based on a result of the detection.

2. The method of claim 1, wherein step (a1) includes determining whether the raster image is colored by analyzing one or more selected areas of the raster image without analyzing the entire raster image.

3. The method of claim 1, wherein step (a1) includes:
   analyzing the raster image in a first predefined area near a corner of the raster image to determine if it contains any colored samples, and if it does, adding the size and location information of the raster image into the image information list;

if the first predefined area does not contain any colored samples, analyzing the raster image in a second predefined area near a center of the raster image to determine if it contains any colored samples, and if it does, adding the size and location information of the raster image into the image information list; and if the first and second areas do not contain any colored samples, dividing the raster image into a predefined plurality of partitions, and analyzing each of a selected subset of partitions to determine if it contains any colored samples, and if any of the selected partition contains a colored sample, adding the size and location information of the raster image into the image information list.

4. The method of claim 3, wherein the selected subset of partitions includes every other partition.

5. The method of claim 1, further comprising:

before step (a), receiving a mode selection from a user indicating a first mode or a second mode, wherein steps (a), (b) and (c) are performed if the first mode is selected; and if the second mode is selected, generating a raster image of the page using the page elements, detecting any colored samples in the raster image of the page, and marking the page as colored or black and white based on a result of the detection.

6. The method of claim 1, wherein in step (c), the raster image of the page is generated using a resolution value inputted by a user, wherein the method further comprises, before step (c), receiving the resolution value from a user interface terminal.

7. A computer program product comprising a non-transitory computer usable medium having a computer readable program code embedded therein for controlling a data processing apparatus, the computer readable program code configured to cause the data processing apparatus to execute a process for detecting color content in a page of a document, the page containing a plurality of page elements including raster images and non-raster graphical elements, the process comprising:

(a) analyzing each page element, including:

(a1) for each raster image, determining whether it is colored, and if it is, storing location and size information about the raster image in an image information list; and (a2) for each non-raster graphical element, determining whether it overlaps a raster image previously stored in the image information list, and if it does, removing the overlapped raster image from the image information list;

(b) after analyzing all page elements of the page, determining whether any raster image remains in the image information list, and marking the page as colored if any raster image remains, and (c) if no raster image remains in the image information list, generating a raster image of the page using the page elements, detecting any colored samples in the raster image of the page, and marking the page as colored or black and white based on a result of the detection.

8. The computer program product of claim 7, wherein step (a1) includes determining whether the raster image is colored by analyzing one or more selected areas of the raster image without analyzing the entire raster image.

9. The computer program product of claim 7, wherein step (a1) includes:

analyzing the raster image in a first predefined area near a corner of the raster image to determine if it contains any colored samples, and if it does, adding the size and location information of the raster image into the image information list;

if the first predefined area does not contain any colored samples, analyzing the raster image in a second predefined area near a center of the raster image to determine if it contains any colored samples, and if it does, adding the size and location information of the raster image into the image information list; and if the first and second areas do not contain any colored samples, dividing the raster image into a predefined plurality of partitions, and analyzing each of a selected subset of partitions to determine if it contains any colored samples, and if any of the selected partition contains a colored sample, adding the size and location information of the raster image into the image information list.

10. The computer program product of claim 9, wherein the selected subset of partitions includes every other partition.

11. The computer program product of claim 7, wherein the process further comprises:

before step (a), receiving a mode selection from a user indicating a first mode or a second mode, wherein steps (a), (b) and (c) are performed if the first mode is selected; and if the second mode is selected, generating a raster image of the page using the page elements, detecting any colored samples in the raster image of the page, and marking the page as colored or black and white based on a result of the detection.

12. The computer program product of claim 7, wherein in step (c), the raster image of the page is generated using a resolution value inputted by a user, wherein the method further comprises, before step (c), receiving the resolution value from a user interface terminal.

* * * * *